United States Patent
Imamura

(10) Patent No.: US 9,646,420 B2
(45) Date of Patent: May 9, 2017

(54) DISPLAY CONTROL METHOD AND INFORMATION PROCESSING APPARATUS

(71) Applicant: FUJITSU LIMITED, Kawasaki-shi, Kanagawa (JP)

(72) Inventor: Kyosuke Imamura, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 14/669,098

(22) Filed: Mar. 26, 2015

(65) Prior Publication Data

US 2015/0339856 A1 Nov. 26, 2015

(30) Foreign Application Priority Data

May 26, 2014 (JP) .................................. 2014-108326

(51) Int. Cl.
| | | |
|---|---|---|
| *G06K 9/00* | (2006.01) | |
| *G06T 19/00* | (2011.01) | |
| *G03B 13/36* | (2006.01) | |
| *H04N 5/232* | (2006.01) | |
| *G03B 13/00* | (2006.01) | |

(52) U.S. Cl.
CPC .......... *G06T 19/006* (2013.01); *G03B 13/36* (2013.01); *H04N 5/23212* (2013.01)

(58) Field of Classification Search
USPC ....... 382/100, 103, 106–107, 162, 168, 173, 382/181, 219, 232, 254–260, 274, 276, 382/286–291, 305, 312, 190; 369/116; 396/123; 348/345, 349
See application file for complete search history.

(56) References Cited

U.S. PATENT DOCUMENTS

| | | | | |
|---|---|---|---|---|
| 5,914,921 A | * | 6/1999 | Yanagi ..................... | G11B 7/09 369/116 |
| 2005/0168621 A1 | * | 8/2005 | Kageyama ......... | H04N 5/23212 348/349 |
| 2008/0193115 A1 | * | 8/2008 | Uenishi .................... | G02B 7/08 396/123 |
| 2008/0285854 A1 | * | 11/2008 | Kotake ................. | G06T 7/0042 382/190 |
| 2013/0188090 A1 | * | 7/2013 | Saito .................. | H04N 5/23212 348/345 |

FOREIGN PATENT DOCUMENTS

| | | |
|---|---|---|
| JP | 2007-52061 | 3/2007 |
| JP | 2007-52349 | 3/2007 |

OTHER PUBLICATIONS

Extended Search Report issued Jul. 16, 2015 in European Patent Application No. 15162550.6.

\* cited by examiner

*Primary Examiner* — Seyed Azarian
(74) *Attorney, Agent, or Firm* — Oblon, McClelland, Maier & Neustadt, L.L.P.

(57) ABSTRACT

An information processing apparatus includes circuitry configured to: control an imaging device to stop a first focus adjustment when a specific object is detected from a first image captured by the imaging device while the first focus adjustment is in execution, the first focus adjustment being performed at each first time interval by the imaging device, and control the imaging device to start a second focus adjustment when the specific object is not detected from a second image captured by the imaging device after the imaging device is controlled to stop the first focus adjustment.

19 Claims, 11 Drawing Sheets

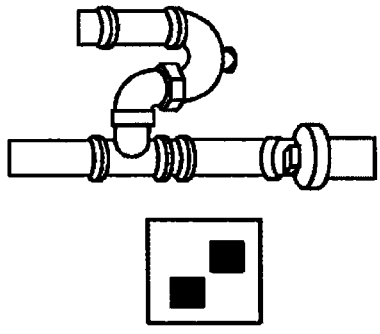
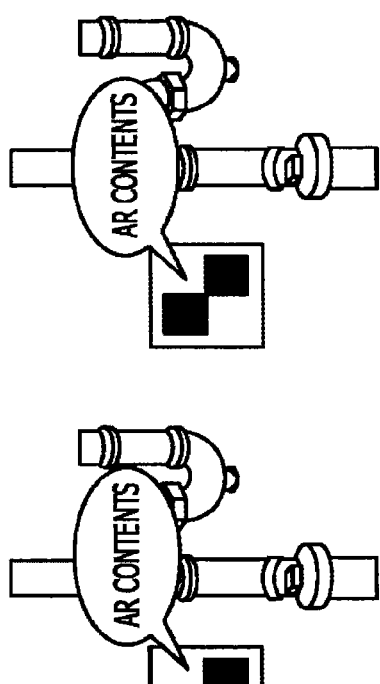
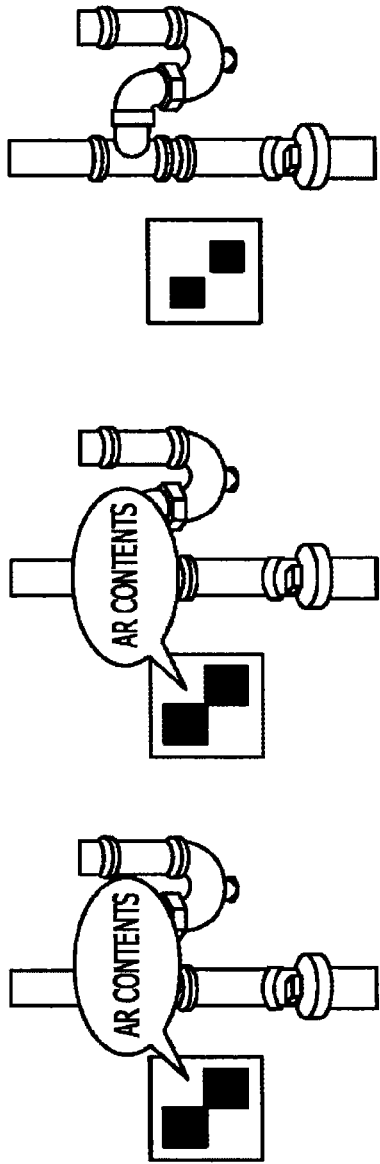

DISPLAY CONTROL METHOD AND INFORMATION PROCESSING APPARATUS

CROSS-REFERENCE TO RELATED APPLICATION

This application is based upon and claims the benefit of priority of the prior Japanese Patent Application No. 2014-108326, filed on May 26, 2014, the entire contents of which are incorporated herein by reference.

FIELD

The embodiments discussed herein relate to control for a focus adjustment.

BACKGROUND

Augmented reality (AR) is a technique for recognizing a reference object (marker) included in an imaged image and adding prescribed information to the recognized marker and displaying. AR involves first an object being photographed using a camera and then the photographed image data is input into an AR application which carries out processing related to AR. The AR application recognizes the marker included in the input image data and adds and displays prescribed information corresponding to the recognized marker.

The camera has an auto-focus function for automatically bringing the object into focus. The camera's photographing timing is a fixed frame interval. The AR application does not control the actions of the camera, and the photographing and auto-focus actions of the camera are independent of the AR application.

The following first and second techniques represent photography and photographic image processing.

An imaging device of the first technique is provided with an imaging unit, a focusing unit, and an object searching unit. The imaging unit converts an optical image formed on an image forming surface into image data. The focusing unit moves a focus lens for performing focus adjustment of the optical image to detect a focus position, and positions the focus lens at the detected focus position. The object searching unit searches a prescribed search region in the current video signal region to determine whether an image region of the object in a video signal region brought into focus with the most recent focusing action changes in relation to a prescribed threshold, and reactivates the focusing unit only if the object image region has changed. This technique is disclosed for example in Japanese Laid-open Patent Publication No. 2007-52061.

The second technique involves a microcomputer for focus control stopping a focus adjustment after bringing an object into focus. A determination is made thereafter as to whether the focusing is attained for a plurality of blocks that constitute the photographed image. While performing pan/tilt driving, a focus adjustment of a focus adjusting unit is activated when all the blocks that are in focus deviate from the photographed image, or when only a prescribed number remain, or when a prescribed ratio of the blocks is deviated. This technique is disclosed for example in Japanese Laid-open Patent Publication No. 2007-52349.

SUMMARY

According to an aspect of the invention, an information processing apparatus includes circuitry configured to: control an imaging device to stop a first focus adjustment when a specific object is detected from a first image captured by the imaging device while the first focus adjustment is in execution, the first focus adjustment being performed at each first time interval by the imaging device, and control the imaging device to start a second focus adjustment when the specific object is not detected from a second image captured by the imaging device after the imaging device is controlled to stop the first focus adjustment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A, 1B, 1C, and 1D are diagrams for comparing the execution of auto-focus in response to the state of focus of a marker in an embodiment and in a first comparative example;

DESCRIPTION OF EMBODIMENTS

Figure 2:
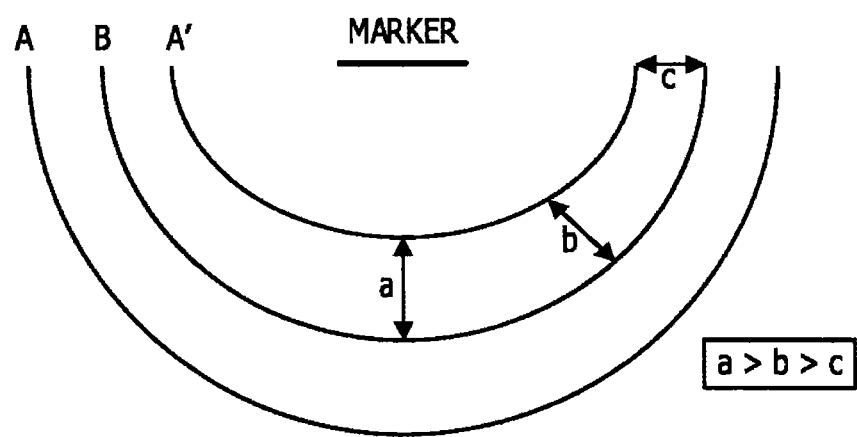
FIG. 2 is a view for explaining an appearance in which a range of distances from an object recognizable as a marker changes in response to the angle from which the marker is imaged.

Although the auto-focus processing of the camera is executed independent of the AR application and is conducted at prescribed time intervals or at a prescribed timing, the focusing may deviate greatly while performing the auto-focus. As a result, the AR application is not able to recognize the marker from the photographed image while the auto-focus is being executed.

Although the AR application may not able to recognize the marker from a greatly out-of-focus image, the AR application may recognize the marker in some instances if the deviation from focus of the image is small. That is, the attainment or loss of focus does not necessarily correspond to the recognition or non-recognition of the marker by the AR application.

When a marker is reflected in whether the obtained image is brought into focus or not is not important so long as the marker can be recognized correctly. Auto-focus processing executed while the AR application is able to recognize the marker causes the recognition of the marker to become impossible. As a result, the AR contents are not displayed and AR quality is reduced.

When the processing related to AR and the auto-focus processing are executed independent of each other, the auto-focus processing may be performed on the camera side even if the AR application is unable to recognize the marker. Further, if a decision of whether to implement the auto-focus action is based on the distance between an object in the image and the camera, the auto-focus processing may be performed even if the AR application is able to recognize the marker.

Accordingly, one aspect of a technique disclosed in the present embodiment inhibits any effect on the recognition of a reference object caused by the focus adjustment by the camera.

In the embodiment, the execution or stoppage of the auto-focus action is controlled based on the recognition state of the marker, that is, whether or not the marker is recognized. Specifically, if the marker is recognized, the auto-focus action is controlled so as not to be executed, and if the marker is not recognized, the auto-focus action is controlled so as to be executed. In doing so, the auto-focus action can be controlled so as not to be executed when the marker is recognized so as to inhibit an unnecessary focus adjustment. As a result, the recognition of the recognized marker becoming impossible due to an unnecessary focus adjustment can be inhibited.

First, the actions will be compared with a comparative example in order to explain the processing in the embodiment. The actions of the embodiment will be compared first to a comparative example 1 in which the execution of the auto-focus action is controlled in response to whether or not an object (marker) is brought into focus.

FIGS. 1A, 1B, 1C, and 1D are diagrams for comparing the presence or absence of the execution of the auto-focus in response to a focusing state (brought into focus or not) of the marker with regard to the embodiment and the first comparative example. FIG. 1A illustrates a state (case A) in which the marker is in focus. FIG. 1B illustrates a state (case B) in which the marker is slightly out of focus. FIG. 1C illustrates a state (case C) in which the marker is completely out of focus. FIG. 1D depicts the presence or absence of the auto-focus execution in the first comparative example and in the embodiment for each of the cases A to C. The pipes in FIGS. 1A to 1C are depicted as indicators to indicate the deviation from focus in relation to the marker in order to see the diagram more easily, and the pipes are disposed in a different layer than that of the marker.

The marker is in focus and the marker can be recognized in FIG. 1A. Therefore, the auto-focus is not executed in either the first comparative example or the embodiment.

The marker is slightly out of focus but marker recognition is possible in FIG. 1B. Therefore, the auto-focus is executed in the first comparative example in which the auto-focus is executed whether or not the marker is in focus. Conversely, the auto-focus is not executed in the embodiment in which the execution of the auto-focus is controlled based on whether or not the AR application is able to recognize the marker.

The marker is completely out of focus and the marker recognition is impossible in FIG. 1C. Therefore, the auto-focus is executed in both the first comparative example and the embodiment.

According to the embodiment, the auto-focus can be controlled so as not be executed when the marker recognition is possible even though the marker is slightly out of focus as in the case illustrated in FIG. 1B. The auto-focus executed regardless of whether or not the marker can be recognized causes the recognition of the recognizable marker to become impossible. By inhibiting the execution of the auto-focus in this way, the quality of the marker recognition can be improved.

Next, the actions of the embodiment will be compared with a second comparative example in which the execution of the auto-focus is controlled based on whether or not the distance between the object and the camera is within a prescribed threshold.

A range of distances from an object recognizable as a marker changes in response to the angle from which the marker is imaged. FIG. 2 is a view for explaining an appearance in which the range of distances from the object recognizable as the marker changes in response to the angle from which the marker is imaged. FIG. 2 illustrates the relationship between the angle from which the marker is imaged and a range in which the marker can be recognized when the focal length is a prescribed value. The focal length of the camera is represented by x (fixed distance) in FIG. 2, and the reference symbol B indicates the position of the camera from the marker when the marker is in focus. Reference symbols A and A' indicate distances of the camera from the marker within the recognition limit of the marker. That is, the range A to A' indicates a range of positions of the camera in which the marker can be recognized when the focal length of the camera is x. Reference symbols a, b and c indicate distances between A and B at prescribed angles.

As illustrated in FIG. 2, the width of deviation from B in which the marker can be recognized differs according to the angle with respect to the marker. The condition "a>b>c" is depicted in FIG. 2. Therefore, the determination result of whether the marker can be recognized does not accurately match whether or not the distance between the object and the camera is a fixed range. Consequently, the auto-focus may be executed due to the angle regardless of whether the marker can be recognized in the second comparative example in which the execution of the auto-focus is controlled based on whether or not the distance between the object and the camera is within a prescribed threshold.

First Embodiment

Figure 3:
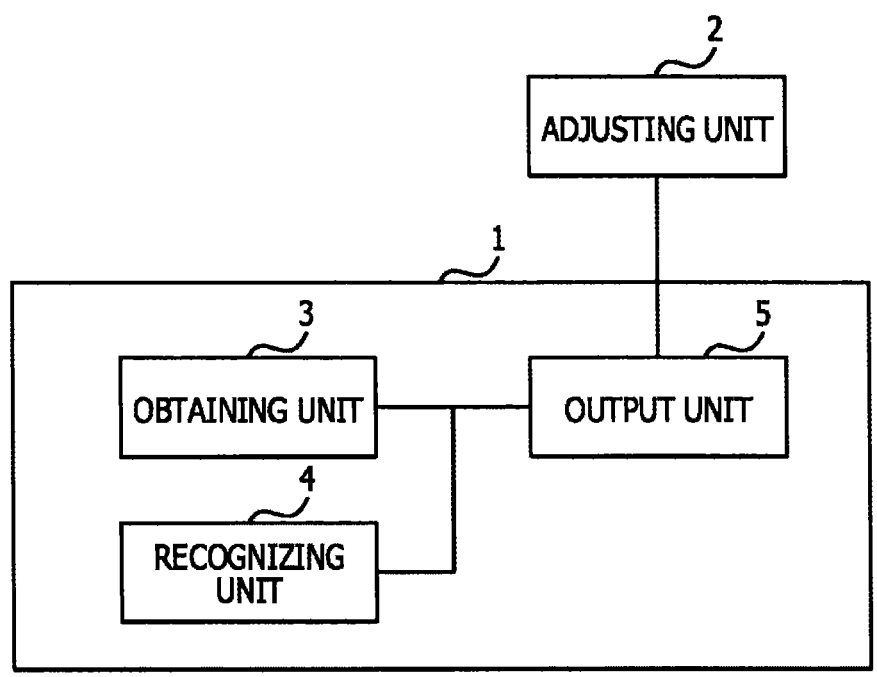
FIG. 3 illustrates an example of a configuration of an information processing apparatus according to a first embodiment.

FIG. 3 illustrates an example of a configuration of an information processing apparatus according to a first embodiment. An information processing apparatus 1 in FIG. 3 includes an obtaining unit 3, a recognizing unit 4, and an output unit 5. The output unit 5 is connected to an adjusting unit 2. The adjusting unit 2 may be included in the information processing apparatus 1.

The adjusting unit 2 controls the execution of a focus adjustment with regard to image data at a prescribed timing.

The obtaining unit 3 obtains the image data.

The recognizing unit 4 recognizes identification information of a reference object included in the image data obtained by the obtaining unit 3.

The output unit 5 outputs stop instruction information for causing the adjusting unit 2 to stop the control processing when it is determined that the identification information is recognized as a result of recognition processing by the recognizing unit 4, and outputs start instruction information for causing the adjusting unit 2 to start the control processing when the determination that the identification information is recognized is changed to a determination that the identification information is not recognized after the output of the stop instruction information.

The adjusting unit 2 executes the focus adjustment of the image data at each first time interval.

The output unit 5 outputs the stop instruction information for causing the adjusting unit 2 to stop the control processing when it is determined that the identification information is recognized as a result of recognition processing by the recognizing unit 4. Next, the output unit 5 outputs the start instruction information to cause the adjusting unit 2 to start the control processing to execute the focus adjustment of the image data at each second time interval which is shorter than the first time interval when the determination that the identification information is recognized changes to a determination that the identification information is not recognized after the output of the stop instruction information. The output unit 5 then outputs control instruction information to cause the adjusting unit 2 to start the control processing to execute the focus adjustment of the image data at each first time interval when the determination that the identification information is recognized is not conducted within a prescribed period after the output of the start instruction information.

Figure 4:
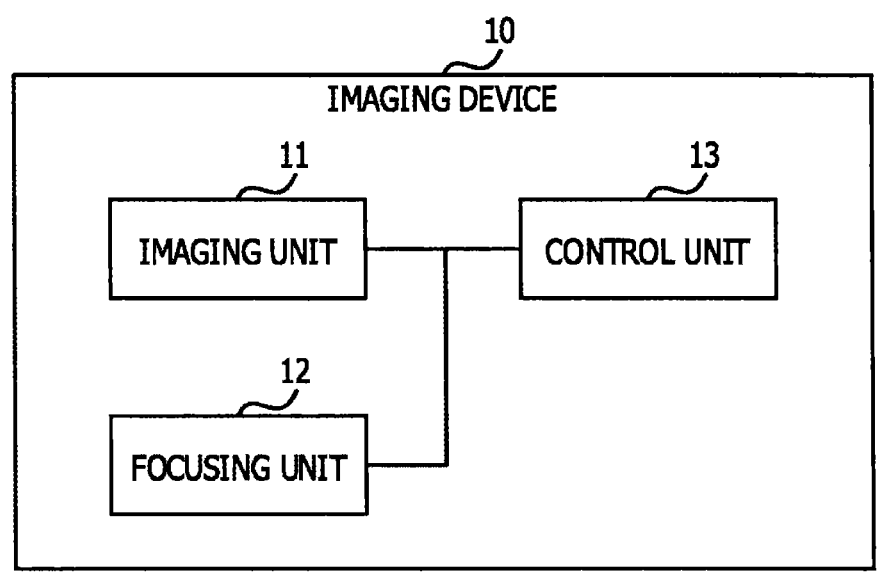
FIG. 4 illustrates an example of a configuration of an imaging device according to the first embodiment.

FIG. 4 illustrates an example of a configuration of an information processing apparatus according to the first embodiment. In FIG. 4, an imaging device 10 includes an imaging unit 11, a focusing unit 12, and a control unit 13. The imaging device 10 is an example of the information processing apparatus 1. The focusing unit 12 is an example of the adjusting unit 2. The control unit 13 is an example of the obtaining unit 3, the recognizing unit 4, and the output unit 5.

The imaging unit 11 images an object and outputs the imaged image (still or moving image) to the control unit 13.

The focusing unit 12 executes the auto-focus to automatically bring the object of the imaging unit 11 into focus at each prescribed time interval. That is, the focusing unit 12 performs focus adjustment to bring the image imaged by the imaging unit 11 into focus at the prescribed time interval. In the following explanation, the processing over a prescribed period in which the auto-focus is repeatedly executed at each prescribed time interval is referred to as focus control processing. The timing for executing each auto-focus in the focus control processing may not be performed at fixed time intervals or may be repeated at a prescribed timing.

The control unit 13 obtains the image from the imaging unit 11 and performs processing to recognize the reference object in the obtained image at the prescribed time interval or at the prescribed timing. The reference object is a prescribed form (shape, pattern, color, or a combination thereof) in the obtained image. The reference object may be, for example, a marker or a specific pattern of an image, or may be a quick response (QR) code or a bar code. The reference object is a key for specifying a position for displaying added information and causing the added information to appear in AR. Alternatively, the target recognized by the control unit 13 may be a figure or a specific thing in actual existence (including a recognition target in markerless AR). For simplification in the following explanation, the reference objects that are the target of the recognition by the control unit 13 are collectively referred to as a marker. The control unit 13 recognizes the marker and then superposes the image corresponding to the recognized marker onto the marker and outputs the same to a prescribed output device. The corresponding information associated with the marker and the image superposed on the marker may be stored in a prescribed storage region of the imaging device 10, or the control unit 13 may specify the image corresponding to the recognized marker by referring to the corresponding information.

The control unit 13 executes the marker recognition processing at each prescribed time interval. The control unit 13 then controls the execution of the focus control processing in response to a recognition result of the marker recognition processing. That is, if the control unit 13 recognizes the marker, the control unit 13 outputs the stop instruction information for stopping the focus control processing to the focusing unit 12. The control unit 13 also outputs restart instruction information for restarting (starting) the focus control processing when the recognition of the marker is not performed after outputting the stop instruction information for the focus control processing.

The fact that the control unit 13 is unable to recognize the marker specifically indicates a case in which the recognition processing is continued for a prescribed number of times or more and the marker is not recognized. For example, when the marker recognition processing is performed every 0.1 seconds, the recognition of the marker may be determined as impossible if the marker recognition is unsuccessful for five or more times consecutively, that is, if the marker recognition is unsuccessful for 0.5 seconds or more. In other words according to this action, the control unit 13 outputs the restart instruction information for restarting the focus control processing if the marker is not recognized after a prescribed time period since the previous marker recognition.

For example, the prescribed time period from when the marker is last recognized until the output of the restart instruction information can be associated with a continuous display time period of the AR contents. The continuous display time period of the AR contents indicates a time period from when the control unit 13 recognizes the marker until the AR contents is superposed on the image continuously. As a result for example, the timing in which the display of the AR contents is stopped can be synchronized with the timing for restarting the focus control processing.

When the marker can be recognized in the subsequent recognition processing after the output of the restart instruction information for the focus control processing, the control unit 13 outputs the stop instruction information for stopping the focus control processing to the focusing unit 12.

The recognition of the marker by the control unit 13 may be performed for example as described below. That is, the control unit 13 first searches for a marker in the obtained image. If a marker is found as a result of the search, the control unit 13 analyzes the found marker. The control unit 13 then obtains information pertaining to the marker such as marker identification information from the analysis result. If the information pertaining to the marker can be obtained, the control unit 13 determines that the marker can be recognized. Conversely, if the information pertaining to the marker is not obtained, the control unit 13 determines that the marker is not recognized.

The recognition of the marker by the control unit 13 may also be performed for example as described below. That is, pattern files based on a prescribed rule are stored in a prescribed storage unit. Patterns included in the pattern files include patterns that can be uniquely identified among the plurality of pattern files. The control unit 13 then detects, based on the prescribed rule, a marker included in the image obtained by the imaging unit 11 and calculates a concordance rate between the detected marker and the pattern files. If the concordance rate is equal to or greater than a prescribed threshold, the control unit 13 recognizes the fact that the detected marker is a marker corresponding to a pattern file. After an object superposed in the marker is associated with a pattern file and the marker is recognized, the control unit 13 superposes the object corresponding to the pattern file onto the marker and displays the same through a prescribed output device.

The control unit 13 may control the interval of the auto-focus to become shorter (make the timing faster) during a prescribed period from the restart of the focus control processing in the restart instruction of the focus control processing. That is, if an auto-focus execution interval before stopping the focus control processing is referred to as T1, the control unit 13 may instruct the focusing unit 12 to execute the auto-focus at an interval T2 which is shorter than the T1 during the prescribed period after the restart. The prescribed period after the restart is a period immediately after the marker is not recognized in which the user of the imaging device 10 is most likely to be searching for the marker. Consequently, by shortening the auto-focus execution interval, the speed of the focusing adjustment on the object including the marker can be increased and, as a result, the period for recognizing the marker again can be shortened.

If a prescribed period has elapsed since the restart of the focus control processing, the control unit 13 causes the auto-focus interval to return to T1. For example, after the prescribed period has elapsed after the output of the restart instruction information, the control unit 13 may once again output to the focusing unit 12 a restart instruction to execute the auto-focus interval at T1. Alternatively, the control unit 13 may previously include contents for changing the timing of the auto-focus after the prescribed period has elapsed in the restart instruction.

Figure 5:
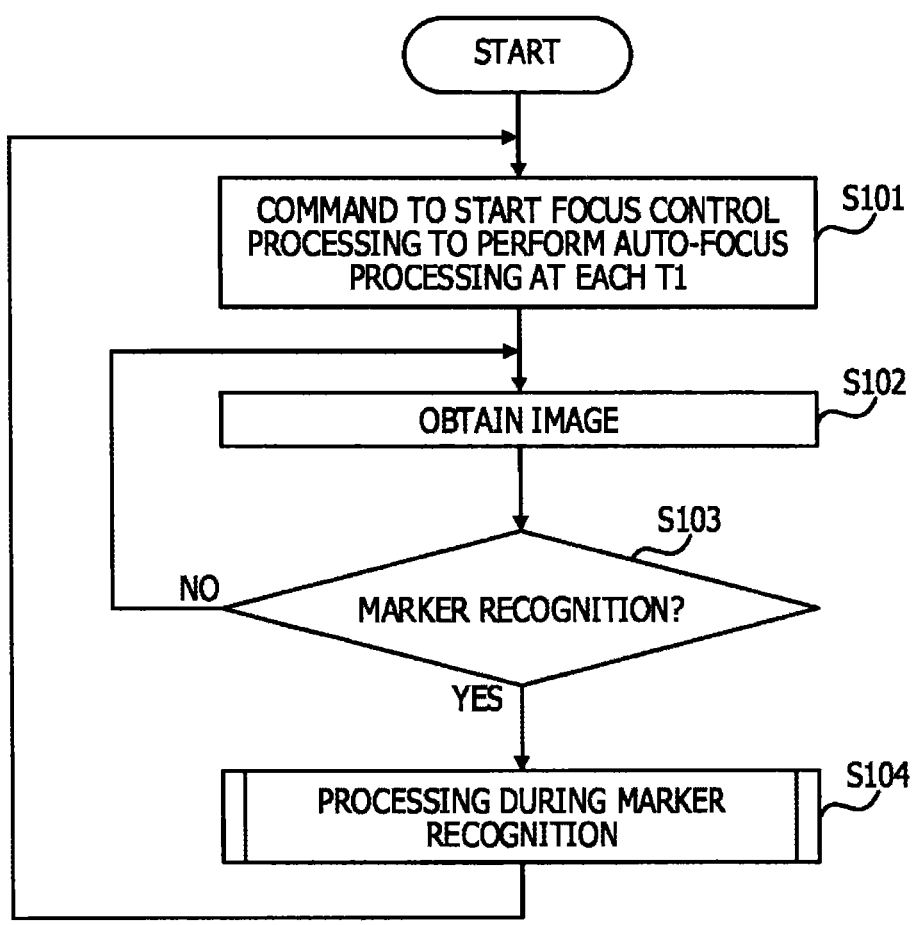
FIG. 5 is an example of a flow chart describing a control by a control unit for executing focus control processing according to the first embodiment.

Next, a flow of the focus control processing execution control will be explained with reference to FIGS. 5 and 6. FIG. 5 is an example of a flow chart describing a control by a control unit for executing focus control processing according to the first embodiment.

In FIG. 5, the control unit 13 first outputs, to the focusing unit 12, a command to start the focus control processing for executing the auto-focus at each T1 (S101). T1 represents a prescribed time interval. The focusing unit 12 that receives the start command starts the focus control processing to execute the auto-focus at each T1.

Next, the control unit 13 obtains an image from the imaging unit 11 (S102). The obtained image is an image imaged by the imaging unit 11.

Next, the control unit 13 performs the recognition processing for a marker included in the image obtained in S103, and determines whether the marker can be recognized as a result of the processing (S103). When the marker is recognized in the recognition processing, the control unit 13 may perform prescribed processing such as superposing the corresponding image on the recognized marker and displaying the AR contents.

If it is determined that the marker is not recognized in S103 (S103, No), the control unit 13 moves the processing back to S102 and repeats the actions in S102 and S103. Conversely, if it is determined that the marker can be recognized (S103, Yes), the control unit 13 executes the processing during marker recognition (S104). The processing during marker recognition is explained below with reference to FIG. 6. After the processing during marker recognition is completed, the control unit 13 moves the processing back to S101 and outputs, to the focusing unit 12, the command to start the focus control processing for executing the auto-focus at T1 (S101). If the focus control processing has already been executed in S101, the focusing unit 12 that received the start command changes the timing of the auto-focus to T1 and starts the focus control processing to execute the auto-focus at T1.

Figure 6:
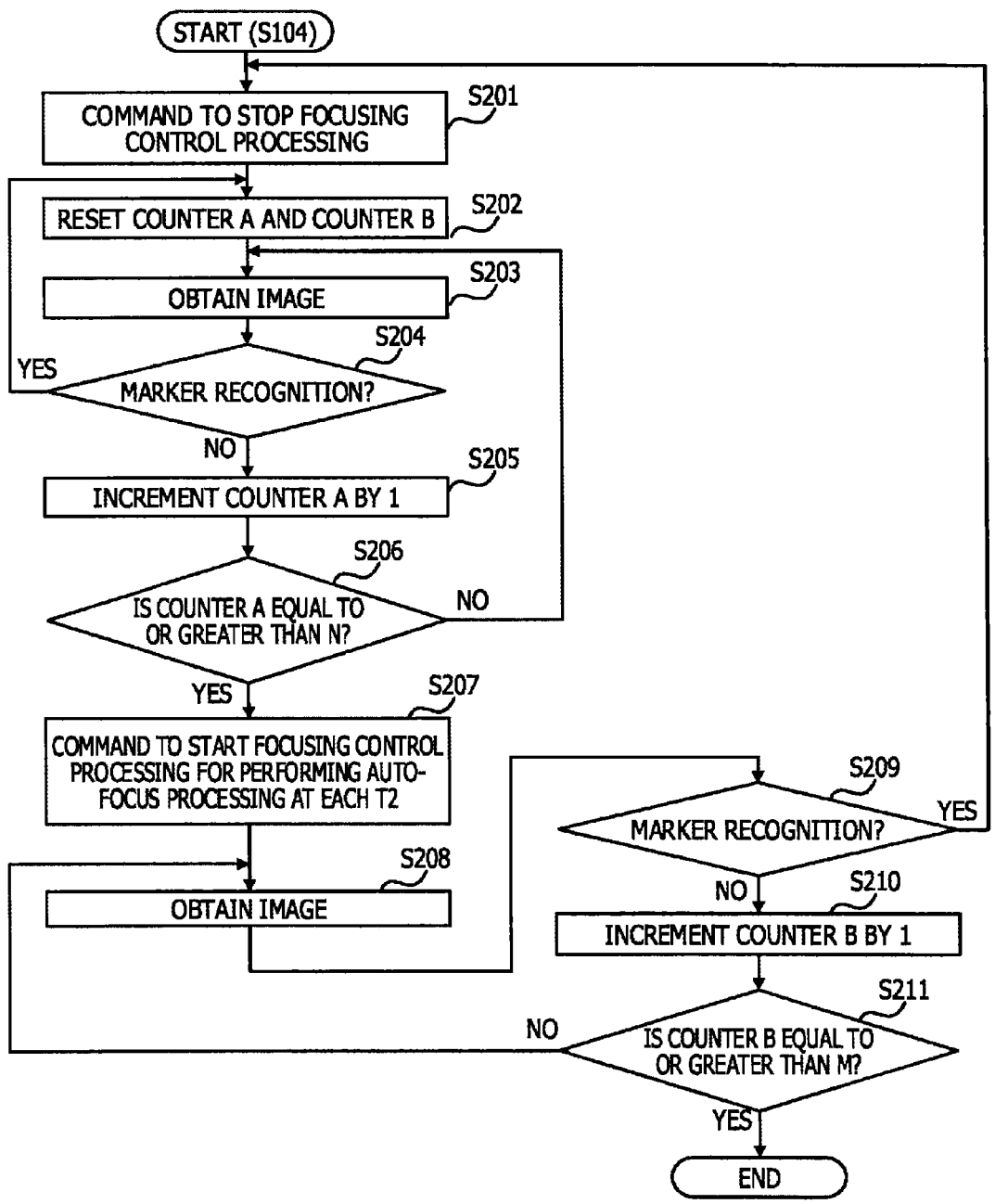
FIG. 6 is an example of a flow chart describing actions by the control unit during marker recognition processing according to the first embodiment.

FIG. 6 is an example of a flow chart describing processing by the control unit 13 during marker recognition according to the first embodiment. Prescribed thresholds N and M and counters A and B, which are prescribed variables, are used in the flow chart in FIG. 6. N is a threshold for controlling the timing for issuing the start (restart) command for executing the focus control processing. M is a threshold for controlling the period for shortening the interval of the auto-focus processing in the focus control processing restarted after the marker is not recognized.

In FIG. 6, the control unit 13 first outputs, to the focusing unit 12, stop instruction information for stopping the focus control processing (S201). The focusing unit 12 that receives the stop instruction information stops the focus control processing.

Next, the control unit 13 resets the values of the counter A and the counter B (S202). Specifically, the control unit 13 for example substitutes "0" for the values of the counter A and the counter B.

Next, the control unit 13 obtains an image from the imaging unit 11 (S203). The obtained image is an image imaged by the imaging unit 11.

Next, the control unit 13 performs the recognition processing for a marker included in the image obtained in S203, and determines whether the marker can be recognized as a result thereof (S204). When the marker is recognized in the recognition processing, the control unit 13 may perform prescribed processing such as superposing the corresponding image on the recognized marker and displaying the AR contents. If it is determined that the marker can be recognized (S204, Yes), the control unit 13 moves the processing to S202 and once again resets the values of the counter A and the counter B (S202).

Conversely, if it is determined in S204 that the marker is not recognized (S204, No), the control unit 13 increments the value of the counter A by one (S205).

The control unit 13 then determines whether the value of the counter A is equal to or greater than the threshold N (S206). If it is determined that the value of the counter A is less than the threshold N (S206, No), the control unit 13 moves the processing back to S203.

Conversely, if it is determined in S206 that the value of the counter A is equal to or greater than the threshold N (S206, Yes), the control unit 13 outputs, to the focusing unit 12, the restart instruction information for the focus control processing for executing the auto-focus at each T2 (S207). T2 is a prescribed time interval and is, for example, a time interval shorter than T1. The focusing unit 12 that receives the restart command starts the focus control processing to execute the auto-focus at T2.

Next, the control unit 13 obtains an image from the imaging unit 11 (S208). The obtained image is an image imaged by the imaging unit 11.

Next, the control unit 13 performs the recognition processing for a marker included in the image obtained in S208, and determines whether the marker can be recognized as a result thereof (S209). When the marker is recognized in the recognition processing, the control unit 13 may perform prescribed processing such as superposing the corresponding image on the recognized marker and displaying the AR contents. If it is determined that the marker can be recognized (S209, Yes), the control unit 13 moves the processing back to S201.

Conversely, if it is determined in S209 that the marker is not recognized (S209, No), the control unit 13 increments the value of the counter B by one (S210).

The control unit 13 then determines whether the value of the counter B is equal to or greater than the threshold M (S211). If it is determined that the value of the counter B is less than the threshold M (S211, No), the control unit 13 moves the processing back to S208. Conversely, if it is determined that the value of the counter B is equal to or greater than the threshold M (S211, Yes), the processing is complete.

The auto-focus processing being performed at T1 in the focus control processing in FIGS. 5 and 6 is performed after activation or in a time zone over a certain time period after the marker recognition. This time zone is assumed to be one in which the user of the imaging device 10 carries out actions not related to the marker recognition. The auto-focus processing is performed at T2 immediately after the marker recognition is unsuccessful in a time zone in which the user of the imaging device 10 is able to search for the marker. By making T2 shorter than T1, the interval for marker recognition in the time zone in which the user is likely to be searching for the marker can be reduced. Moreover, actual auto-focusing is preferably performed at least one time during the focus control processing in which the auto-focus processing is performed at each T2. Therefore, if the recognition processing execution interval is t, the value for T2 may be set so that the equation T2<(t×M) is satisfied.

The images obtained by the control unit 13 in S102, S203, and S208 are images imaged by the imaging unit 11 and are images imaged at different times.

Figure 7:
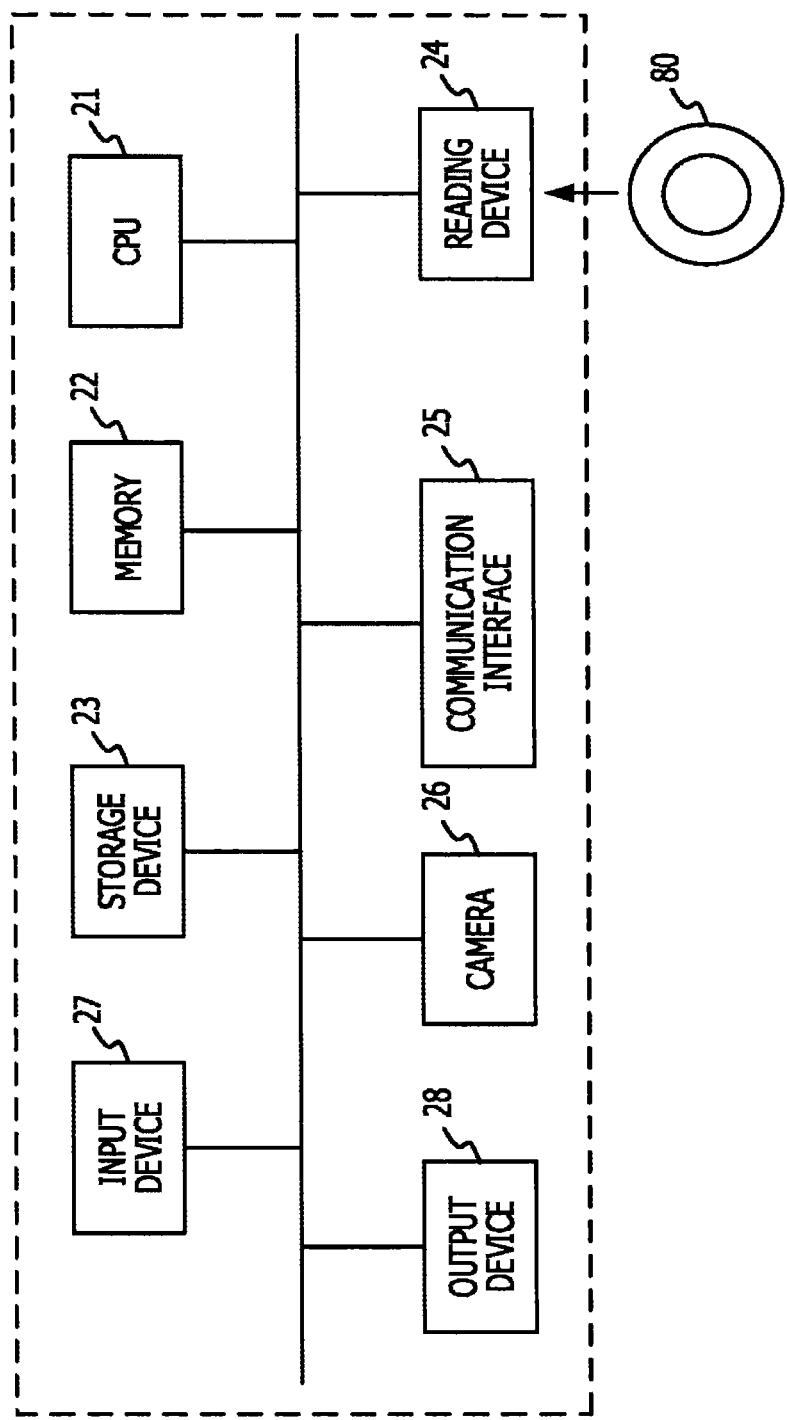
FIG. 7 illustrates an example of a hardware configuration of the imaging device according to an embodiment.

The following is an explanation of a hardware configuration of the imaging device 10 according to the embodiment. FIG. 7 illustrates an example of a hardware configuration of the imaging device 10.

The imaging device 10 in FIG. 7 includes a central processing unit (CPU) 21, a memory 22, a storage device 23, a reading device 24, a communication interface 25, a camera 26, an input device 27, and an output device 28. The CPU 21, the memory 22, the storage device 23, the reading device 24, the communication interface 25, the camera 26, the input device 27, and the output device 28 are interconnected over a network or through a bus.

The CPU 21 provides a portion or all of the functions of the control unit 13 by using the memory 22 to execute a program described in order in the above flow charts.

The memory 22 is a semiconductor memory for example, and is configured to include a random access memory (RAM) region and a read-only memory (ROM) region. The storage device 23 is for example a hard disk. The storage device 23 may be a semiconductor memory such as a flash memory. The storage device 23 may also be an external recording device. The patterns corresponding to the marker may be stored in a prescribed storage region in the storage device 23, or information of objects superposed on the marker and displayed may be stored in association with the patterns in a prescribed storage region in the storage device 23.

The reading device 24 accesses a detachable storage medium 80 according to an instruction from the CPU 21. The detachable storage medium 80 is realized for example by a semiconductor device (e.g., a USB memory), a medium in which information is input and output through magnetic actions (e.g., a magnetic disc), or medium in which information is input and output through optical actions (e.g., a CD-ROM or DVD). The reading device 24 may not be included in the imaging device 10.

The communication interface 25 is an interface for carrying out communication over a network according to an instruction from the CPU 21. The communication interface 25 may not be included in the imaging device 10.

The camera 26 is a device for imaging an object or for automatically carrying out focusing adjustments on the object. The camera 26 provides a portion or all of the functions of the imaging unit 11 and the focusing unit 12. The camera 26 may be connected to the outside of the imaging device 10 through a communication network or a bus.

The input device 27 receives prescribed instructions from the user. The input device 27 may not be included in the imaging device 10.

The output device 28 outputs prescribed information according to an instruction from the CPU 21. The output device 28 is a display device for displaying, for example, the information in which the added information is superposed on the marker.

The program of the embodiment may be provided, for example, to the imaging device 10 in the following forms.
(1) Previously installed in the storage device 23.
(2) Provided through the detachable storage medium 80.
(3) Provided from a program server (not illustrated) through the communication interface 25.

Moreover, a portion of the imaging device 10 may be realized by hardware. Alternatively, the imaging device 10 may be realized by a combination of software and hardware.

Second Embodiment

In a second embodiment, the control unit does not make the image obtained during the focus control processing the object of the marker recognition processing. The image obtained during the focus control processing has a high likelihood of being greatly out of focus while the auto-focus is being executed, and in this case, a load on the control unit can be reduced by not making the image obtained during the focus control processing the target of the recognition processing because the recognition of the marker is impossible.

Figure 8:
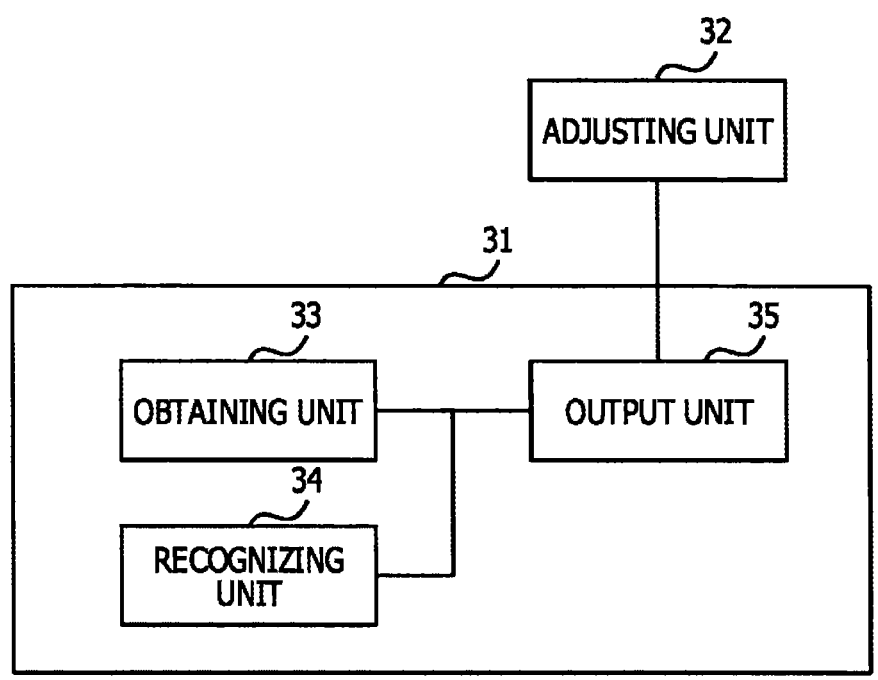
FIG. 8 illustrates an example of a configuration of an information processing apparatus according to a second embodiment.

FIG. 8 illustrates an example of a configuration of an information processing apparatus according to the second embodiment. An information processing apparatus 31 in FIG. 8 includes an obtaining unit 33, a recognizing unit 34, and an output unit 35. The output unit 35 is connected to an adjusting unit 32. The adjusting unit 32 may be included in the information processing apparatus 31.

The adjusting unit 32 controls the execution of a focus adjustment for image data at a prescribed time interval.

The obtaining unit 33 obtains the image data in which a target having a prescribed form is imaged.

The output unit 35 outputs to the adjusting unit 32 stop instruction information for stopping the control processing if the form of the target included in the image data obtained by the obtaining unit 33 can be recognized. The output unit 35 outputs to the adjusting unit 32 start instruction information for starting the control processing if the form of the target is not recognizable after the output of the stop instruction information.

The recognizing unit 34 recognizes the form of the target included in the image data if the control processing by the adjusting unit 32 is stopped, and does not recognize the form of the target while the control processing by the adjusting unit 32 is being executed.

Figure 9:
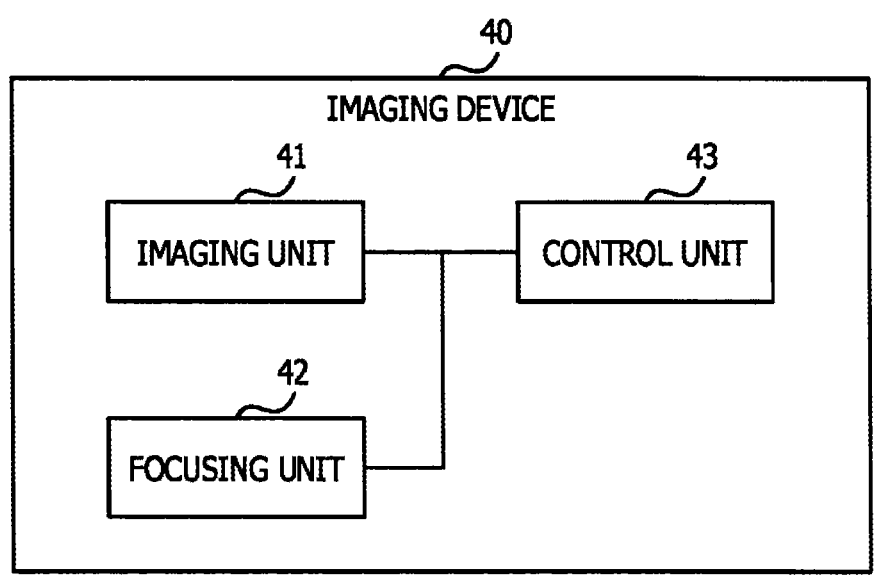
FIG. 9 illustrates an example of a configuration of an imaging device according to the second embodiment.

FIG. 9 illustrates an example of a configuration of an imaging device according to the second embodiment. An imaging device 40 in FIG. 9 includes an imaging unit 41, a focusing unit 42, and a control unit 43. The imaging device 40 is an example of the information processing apparatus 31. The focusing unit 42 is an example of the adjusting unit 32. The control unit 43 is an example of the obtaining unit 33, the recognizing unit 34, and the output unit 35.

The actions of the imaging unit 41 and the focusing unit 42 according to the second embodiment are the same as the actions of the imaging unit 11 and the focusing unit 12 in the first embodiment.

The control unit 43 performs processing to recognize the marker included in the image obtained by the imaging unit 41 at prescribed time intervals while the focus control processing by the focusing unit 42 is stopped. Conversely, the marker recognition processing is not performed while the focus control processing by the focusing unit 42 is being executed.

Specifically, the control unit 43 determines whether the marker can be recognized at the prescribed time interval and stops the focus control processing based on the result of the determination. Specifically, the control unit 43 outputs to the focusing unit 42 stop instruction information for stopping the focus control processing if it is determined that the marker can be recognized as a result of the determination.

The control unit 43 also outputs, to the focusing unit 42, restart instruction information for restarting (starting) the focus control processing when the marker is not recognized while performing the marker recognition processing at the prescribed time interval after outputting the stop instruction information for the focus control processing. The marker recognition processing is the same as that of the first embodiment. After outputting the restart instruction information for the focus control processing, the control unit 43 performs the determination processing at the prescribed time interval and outputs, to the focusing unit 42, the stop instruction information for stopping the focus control processing based on the result of the determination processing.

Specifically, the control unit 43 first searches, for example, for the marker in the obtained image in the determination processing. If a marker is found as a result of the search, the control unit 43 analyzes the found marker. The control unit 43 then determines whether information pertaining to the marker, such as marker identification information, can be obtained based on the analysis result. If it is determined that the information pertaining to the marker such as marker identification information can be obtained based on the analysis result, the control unit 43 determines that the marker can be recognized. Conversely, if it is determined that the information pertaining to the marker such as marker identification information is not obtained based on the analysis result, the control unit 43 determines that the marker is not recognized. If the marker is not found in the obtained image, the control unit 43 determines that the marker is not recognized.

Next, a flow of the focus control processing execution control according to the second embodiment will be explained with reference to FIGS. 10 and 11. T1, T2, N, M, counter A and counter B in FIGS. 10 and 11 are the same as those in FIGS. 5 and 6.

Figure 10:
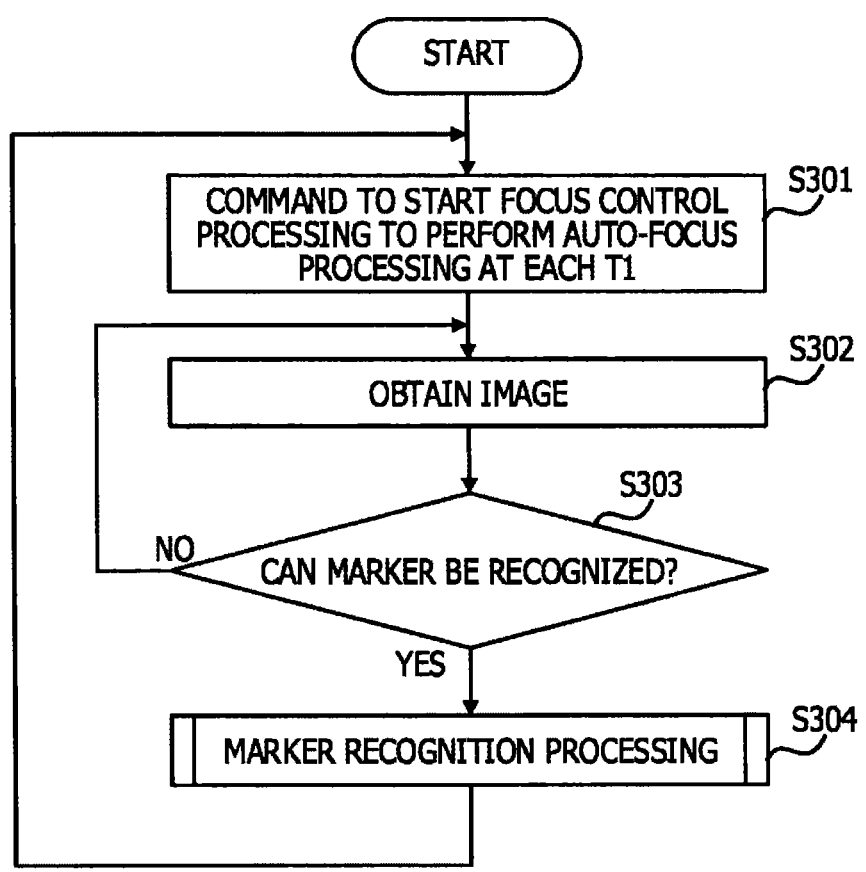
FIG. 10 is an example of a flow chart describing a control by a control unit for executing focus control processing according to the second embodiment.
Figure 11:
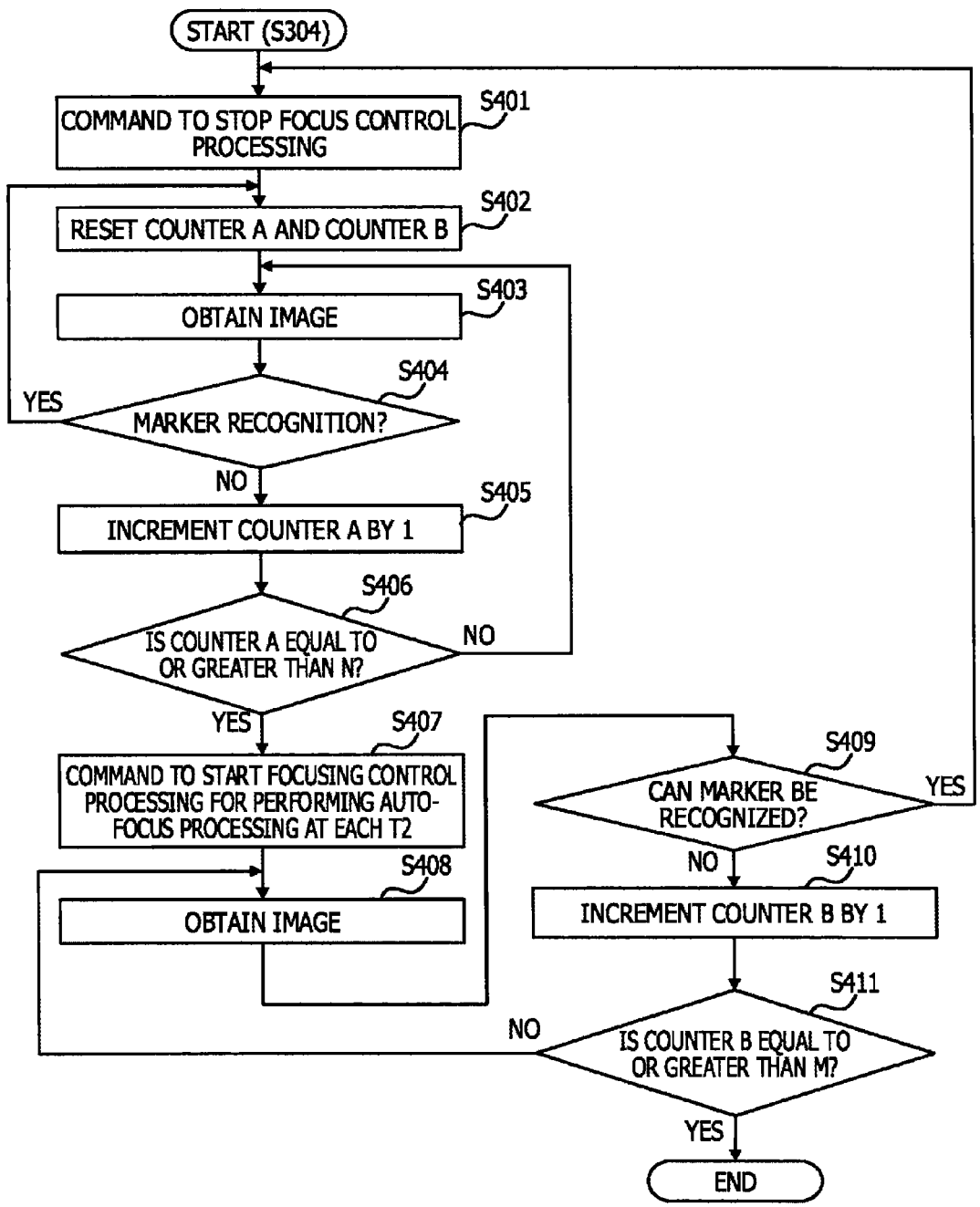
FIG. 11 is an example of a flow chart describing marker recognition processing actions by the control unit according to the second embodiment.

FIG. 10 is an example of a flow chart describing a control by the control unit 43 for executing focus control processing according to the second embodiment.

In FIG. 10, the control unit 43 first outputs, to the focusing unit 42, a command to start the focus control processing for executing the auto-focus at T1 (S301). The focusing unit 42 that receives the start command starts the focus control processing to execute the auto-focus at T1.

Next, the control unit 43 obtains an image from the imaging unit 41 (S302).

Next, the control unit 43 performs the determination processing on the image obtained in S302 (S303). If it is determined that the marker is not recognized (S303, No), the control unit 43 moves the processing back to S302 and repeats the actions in S302 and S303. Conversely, if it is determined that the marker can be recognized (S303, Yes), the control unit 43 executes the marker recognition processing (S304). The marker recognition processing is explained below with reference to FIG. 11. After the marker recognition processing is completed, the control unit 43 once again outputs, to the focusing unit 42, the command to start the focus control processing for executing the auto-focus at T1 (S301).

FIG. 11 is an example of a flow chart describing marker recognition processing actions by the control unit 43 according to the second embodiment.

In FIG. 11, the control unit 43 first outputs, to the focusing unit 42, stop instruction information for stopping the focus control processing (S401). The focusing unit 42 that receives the stop instruction information stops the focus control processing.

Next, the control unit 43 resets the values of the counter A and the counter B (S402). Specifically, the control unit 43 for example substitutes "0" for the values of the counter A and the counter B.

Next, the control unit 43 obtains an image from the imaging unit 41 (S403).

Next, the control unit 43 performs the marker recognition processing for a marker included in the image obtained in S403, and determines whether the marker can be recognized as a result thereof (S404). When the marker is recognized in the recognition processing, the control unit 43 may perform prescribed processing such as superposing the corresponding image onto the recognized marker and displaying the AR contents. If it is determined that the marker can be recognized (S404, Yes), the control unit 43 moves the processing to S402 and once again resets the values of the counter A and the counter B.

Conversely, if it is determined in S404 that the marker is not recognized (S404, No), the control unit 43 increments the value of the counter A by one (S405).

The control unit 43 then determines whether the value of the counter A is equal to or greater than the threshold N (S406). If it is determined that the value of the counter A is less than the threshold N (S406, No), the control unit 43 moves the processing back to S403.

Conversely, if it is determined in S406 that the value of the counter A is equal to or greater than the threshold N (S406, Yes), the control unit 13 outputs, to the focusing unit 42, the restart instruction information for the focus control processing for executing the auto-focus at each T2 (S407). The focusing unit 42 that receives the restart command starts the focus control processing to execute the auto-focus at each T2.

Next, the control unit 43 obtains an image from the imaging unit 41 (S408).

Next, the control unit 43 performs the determination processing on the image obtained in S408 (S409). If it is determined in the determination processing that the marker can be recognized (S409, Yes), the control unit 43 moves the processing back to S401.

Conversely, if it is determined in S409 that the marker is not recognized (S409, No), the control unit 43 increments the value of the counter B by one (S410).

The control unit 43 then determines whether the value of the counter B is equal to or greater than the threshold M (S411). If it is determined that the value of the counter B is less than the threshold M (S411, No), the control unit 43 moves the processing back to S408. Conversely, if it is determined that the value of the counter N is equal to or greater than the threshold M (S411, Yes), the processing is finished.

An example of the hardware configuration of the imaging device 40 according to the second embodiment is the same as that depicted in FIG. 7. The CPU 21 in FIG. 7 provides a portion or all of the functions of the control unit 43. The camera 26 provides a portion or all of the functions of the imaging unit 41 and the focusing unit 42.

While the configuration of superposing a corresponding image on the marker and then outputting the image after the marker is recognized is described in the embodiments, actions after the marker recognition are not limited in this way. For example, various configurations may be provided, such as extracting prescribed information from the recognized marker after the marker is recognized and outputting the extracted information to another application.

The present embodiments are not limited to the embodiments described above and various configurations or embodiments may be apparent without departing from the spirit of the present embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   circuitry configured to:
   control imaging circuitry to stop a first focus adjustment when a specific object is detected from a first image captured by the imaging circuitry while the first focus adjustment is in execution, the first focus adjustment being performed at each first time interval by the imaging circuitry,
   control the imaging circuitry to start a second focus adjustment when the specific object is not detected from a second image captured by the imaging circuitry after the imaging circuitry is controlled to stop the first focus adjustment, and
   control to display a content to be superimposed over the first image, the content being acquired in accordance with the detected specific object,
   wherein the second focus adjustment is performed at each second time interval which is different from the first time interval.

2. The information processing apparatus according to claim 1, wherein the second time interval is shorter than the first time interval.

3. The information processing apparatus according to claim 2, wherein the circuitry is configured to:
   control the imaging circuitry to restart the first focus adjustment when the specific object is not detected from a plurality of images which are captured by the imaging circuitry after the imaging circuitry is controlled to start the second focus adjustment.

4. The information processing apparatus according to claim 1, wherein the specific object is a marker having at least one of a specific shape or pattern.

5. The information processing apparatus according to claim 1, further comprising:
   the imaging circuitry configured to:
   capture the first image and the second image, and
   perform the first focus adjustment and the second focus adjustment.

6. The information processing apparatus according to claim 1, wherein the circuitry is configured to:
   acquire the content corresponding to the specific object when the specific object is detected from the first image,
   and
   control to not display the content to be superimposed over the second image when the specific object is not detected.

7. The information processing apparatus according to claim 1, wherein the first focus adjustment and the second focus adjustment are autofocus operations performed by the imaging circuitry.

8. A display control method comprising:
   controlling, by a circuitry, imaging circuitry to stop a first focus adjustment when a specific object is detected from a first image captured by the imaging circuitry while the first focus adjustment is in execution, the first focus adjustment being performed at each first time interval by the imaging circuitry,
   controlling the imaging circuitry to start a second focus adjustment when the specific object is not detected from a second image captured by the imaging circuitry after the imaging circuitry is controlled to stop the first focus adjustment, and
   controlling to display a content to be superimposed over the first image, the content being acquired in accordance with the detected specific object,
   wherein the second focus adjustment is performed at each second time interval which is different from the first time interval.

9. The display control method according to claim 8, wherein the second time interval is shorter than the first time interval.

10. The display control method according to claim 9, further comprising:
    controlling the imaging circuitry to restart the first focus adjustment when the specific object is not detected from a plurality of images which are captured by the imaging circuitry after the imaging circuitry is controlled to start the second focus adjustment.

11. The display control method according to claim 8, wherein the specific object is a marker having at least one of a specific shape or pattern.

12. The display control method according to claim 8, further comprising:
    acquiring the content corresponding to the specific object when the specific object is detected from the first image,
    and controlling to not display the content to be superimposed over the second image when the specific object is not detected.

13. The display control method according to claim 8, wherein the first focus adjustment and the second focus adjustment are autofocus operations performed by the imaging circuitry.

14. A non-transitory computer-readable medium including computer program, which when executed by circuitry, causes the circuitry to:

control imaging circuitry to stop a first focus adjustment when a specific object is detected from a first image captured by the imaging circuitry while the first focus adjustment is in execution, the first focus adjustment being performed at each first time interval by the imaging circuitry, control the imaging circuitry to start a second focus adjustment when the specific object is not detected from a second image captured by the imaging circuitry after the imaging circuitry is controlled to stop the first focus adjustment, and control to display a content to be superimposed over the first image, the content being acquired in accordance with the detected specific object, wherein the second focus adjustment is performed at each second time interval which is different from the first time interval.

15. The non-transitory computer-readable medium according to claim 14, wherein the second time interval is shorter than the first time interval.

16. The non-transitory computer-readable medium according to claim 15, wherein the program causes the circuitry to:

control the imaging circuitry to restart the first focus adjustment when the specific object is not detected from a plurality of images which are captured by the imaging circuitry after the imaging circuitry is controlled to start the second focus adjustment.

17. The non-transitory computer-readable medium according to claim 14, wherein the specific object is a marker having at least one of a specific shape or pattern.

18. The non-transitory computer-readable medium according to claim 14, wherein the program causes the circuitry to:

acquire the content corresponding to the specific object when the specific object is detected from the first image, and control to not display the content to be superimposed over the second image when the specific object is not detected.

19. The non-transitory computer-readable medium according to claim 14, wherein the first focus adjustment and the second focus adjustment are autofocus operations performed by the imaging circuitry.

* * * * *